Patented Mar. 9, 1948

2,437,307

UNITED STATES PATENT OFFICE 2,437,307

FLUOROHYDROCARBONS BY REACTING HYDROGEN FLUORIDE WITH ACETYLENIC HYDROCARBONS

Leroy Frank Salisbury, Wilmington, Del., assignor to E. I. du Pont de Nemours & Company, Wilmington, Del., a corporation of Delaware No Drawing. Application October 21, 1944, Serial No. 559,847

6 Claims. (Cl. 260—653)

This invention relates to the preparation of fluorohydrocarbons and especially of vinyl fluorides.

Many catalysts consistsing of metals and their oxides either alone or supported on suitable substrates are known to catalyze the reaction between acetylene and hydrogen fluoride to produce vinyl fluoride. Particularly useful compositions are those obtained by impregnating charcoal with a suspension of mercury oxide or by formation of the oxide in situ on the charcoal. In the copending application of Leroy Frank Salisbury, Ser. No. 508,243, filed October 29, 1943, highly useful charcoal-supported mercury compound catalysts are disclosed as employable in the synthesis of vinyl fluoride from acetylene and hydrogen fluoride. In the copending application of Arthur Livingston Barney, Ser. No. 517,837, filed January 11, 1943, there are also described compositions comprising mercury oxide at least partially combined chemically with an oxide of nitrogen supported on an alkaline earth metal salt. Although these catalysts and especially those described in the aforementioned applications of Salisbury and Barney are advantageously useful for their designed purposes, at times they are characterized by certain disadvantages. Thus, a large part of the total mercury present on the charcoal may be lost as free mercury either during the catalyst preparation or during its operation, thus reducing its activity. These charcoal-supported mercury catalysts, although initially very active in the synthesis of vinyl fluoride and 2-fluorobutadiene-1,3, tend to become less active during use, for instance in 12 to 16 hours they may frequently lose as much as 50% of their original activity.

It has been found that the above disadvantages may be overcome effectively through the employment of certain salts of divalent mercury supported on charcoal or other carrier.

Accordingly this invention has as an object the provision of a method for obtaining fluorohydrocarbons which is not subject to the aforementioned disadvantages. A further object is the provision of a practicable process for obtaining compounds of the general formula $RCF=CH_2$ (wherein R is of the group consisting of hydrogen atoms and monovalent hydrocarbon radicals). A still further object is to provide a new and improved method for obtaining vinyl fluoride from acetylene and hydrogen fluoride. Still another object is to provide a new and improved method for preparing 2-fluorobutadiene-1,3 from monovinylacetylene and hydrogen fluoride. Additional objects will become apparent from an examination of the following description and claims.

These and other objects and advantages are accomplished according to the herein described invention which broadly comprises passing a mixture of hydrogen fluoride and a compound having a molecular weight of not more than 85 and the general formula $RC≡CH$, wherein R is of the group consisting of hydrogen atoms and monovalent hydrocarbon radicals, over a catalyst of the group of mercuric salts consisting of mercuric acetate, mercuric chloroamide, beta-chloroethenyl mercuric chloride, mercuric phosphate and mercuric sulfide, said mixture being passed over said catalyst under substantially anhydrous conditions in the vapor phase at a temperature within the range of from 25° C. to 250° C., said catalyst being supported on a carrier.

One preferred embodiment of this invention comprises passing a mixture of hydrogen fluoride and acetylene in the vapor phase over a charcoal-supported mercuric salt selected from the group consisting of mercuric acetate, mercuric chloroamide, beta-chloroethenyl mercuric chloride, mercuric phosphate, and mercuric sulfide as a catalyst, said mixture being passed over said catalyst under anhydrous conditions at a temperature within the range of from 30° C. to 100° C., the mol ratio of hydrogen fluoride to acetylene being within the range of from 2/1 to 1/1.

Another preferred embodiment of this invention comprises passing a mixture of hydrogen fluoride and monovinylacetylene in the vapor phase over a charcoal-supported mercuric salt selected from the group consisting of mercuric acetate, mercuric chloroamide, beta-chloroethenyl mercuric chloride, mercuric phosphate, and mercuric sulfide as a catalyst, said mixture being passed over said catalyst under anhydrous conditions at a temperature within the range of from 30° C. to 100° C., the mol ratio of hydrogen fluoride to monovinylacetylene being within the range of from 2/1 to 1/1.

The following examples are given for illustrative purposes and are not intended to place any restrictions on the herein described invention.

*Example I*

A substantially dry mixture of hydrogen fluoride and acetylene, in which the mol ratio of HF to $HC≡CH$ is about 1.5/1, is passed in the vapor phase at a space velocity of 150 over a catalyst consisting of mercuric acetate-on-charcoal contained in a jacketed tubular converter maintained at 40° C. The exit gases are freed of hydrogen fluoride by passage through granulated soda lime, then freed of any moisture by passage through anhydrous calcium chloride, and finally condensed in a trap cooled with solid carbon dioxide and acetone. After 5½ hours operation, vinyl fluoride is found in an amount corresponding to about an 86% conversion on the basis of the acetylene passed into the reactor. Analysis of the off gas indicated the product to consist of 95.9% vinyl fluoride, 4% acetylene and 0.1% of 1,1-difluoroethane.

The catalyst used in the above example is prepared as follows.

Fifty-one and four tenths grams of mercuric acetate are dissolved in 8 cc. of glacial acetic acid and the solution made up to 150 cc. with distilled water. Three hundred cc. of charcoal are impregnated with the above solution and the mass dried by heating it over a steam bath for 48 hours under a water-pump vacuum and then for 20 hours more at 100° C. under an oil-pump vacuum. The finished catalyst analyzes 26.46% mercury and 0.28% water.

*Example II*

A mixture of dry gases consisting of hydrogen fluoride and acetylene, in which the mol ratio of HF to HC≡CH is 1.7/1, is passed at a space velocity of 170 over a mercuric chloroamide-on-charcoal catalyst contained in a converter heated at 40° C. The off gases are passed through soda lime, then through calcium chloride and finally condensed in a trap cooled with solid carbon dioxide and acetone. Analysis of the product, after a 5-hour run, shows a conversion to vinyl fluoride of 61% and the off gases are found to contain 92% vinyl fluoride and 8% acetylene.

The catalyst of the above example is prepared by suspending in water granular charcoal (8–14 mesh) which has been impregnated with 180 g. of mercuric chloride per liter of charcoal and adding excess aqueous ammonia to the suspension. After stirring for several minutes the mixture is filtered and washed with water. The moist product is dried at 180° C. under a slow stream of dry air. The product analyzes 25.6% mercury, 1.1% nitrogen, and 8.93% chlorine. The atomic ratio of mercury to nitrogen is 1/1.6.

*Example III*

Example II is duplicated using beta-chloroethenyl mercuric chloride on charcoal as a catalyst. This catalyst is obtained by impregnating charcoal with a benzene solution of chlorovinyl mercuric chloride made by saturating aqueous hydrochloric acid solution with mercuric chloride and treating with acetylene as described in Comptes Rendus 26, #1, 60–64. After 6 hours of use the conversion to vinyl fluoride is 36%.

A suitable form of apparatus for use in the synthesis of fluorohydrocarbons according to the process of this invention consists of a reactor, which, for all scale operations, may be constructed from a piece of iron pipe and which contains the catalyst. The reactor may be equipped with an internal temperature measuring device and is preferably immersed in a bath of a suitable liquid, e. g., water, so that the internal temperature may be controlled. The gaseous mixture, after contact with the catalyst, passes through an absorbent for the excess hydrogen fluoride, if any, such as granular soda lime, a drier, and finally a trap cooled with solid carbon dioxide-acetone mixture. The reaction product which collects in the cold trap is separated into its individual components by fractional distillation.

For efficient operation in the synthesis of 2-fluorobutadiene-1,3 from hydrogen fluoride and monovinylacetylene, it is essential that the reacting gases must not be allowed to mix until they enter the reaction chamber. If this precaution is not observed, i. e., if the gases are mixed before they enter the reactor, the reaction between the monovinylacetylene and hydrogen fluoride proceeds as usual but the feed line to the reactor soon becomes plugged with a hard solid containing less than 10% fluorine. This unwanted reaction is sometimes so rapid that the run must be stopped and the apparatus dismantled within one hour from the start of the operation. One practical way of overcoming this serious difficulty is to introduce the gases into the reactor separately, e. g., through a T-fitting at the entry of the reactor. This simple device leads to the very unexpected result of completely eliminating stoppage, which takes place if the gases are mixed beforehand. The gases can, however, be mixed before they come in contact with the catalyst, provided this is done over a granular material such as charcoal. For example, the T-fitting at the entry end of the reactor may be, and preferably is, filled with dry, granulated charcoal or with the catalyst itself. In practice, anhydrous hydrogen fluoride is metered and led to one end of the T-fitting, and the anhydrous acetylene is also metered and led to the other end of the fitting. An inert gas such as nitrogen may be mixed with either the hydrogen fluoride or the acetylene, if desired.

While a form of apparatus suitable for use on a small scale has been described, the operation may be conducted successfully in any appropriate apparatus, provided the precautions indicated above are observed.

It is to be understood that the catalyst must be supported on a carrier. As a carrier for the catalysts used in the practice of this invention charcoal derived from the incomplete combustion of animal or vegetable matter, e. g., wood, bones, nut shells, coconut, etc., is preferred on account of the superior results had therewith. The active charcoal may be in granular or in finely divided condition. When used in a finely divided state, a settling chamber must be attached to the furnace or heating element in order to permit the charcoal to settle out of the gas stream during preparations. Other excellent supports include magnesium fluoride and alkaline earth metal salts, such as those described in copending application Ser. No. 517,837, filed January 11, 1943, by Arthur Livingston Barney, the use of which will be found to promote the activity, prolong the effectiveness of the catalysts, and reduce mercury loss during roasting operation.

It is to be understood, of course, that the only catalysts operable in the process of this invention, i. e., the only catalysts which result in a process not subject to the aforementioned disadvantages of the prior art processes, are mercuric salts selected from the group consisting of mercuric acetate, mercuric chloroamide, beta-chloroethenyl mercuric chloride, mercuric phosphate and mercuric sulfide.

Any compound having a molecular weight of not more than 85 and the general formula RC≡CH, wherein R is of the group consisting of hydrogen atoms and monovalent hydrocarbon radicals may be reacted with hydrogen fluoride in accordance with the process of this invention. One group of compounds of the aforementioned general formula which is particularly well adapted for use in the process of this invention is that group of compounds having a molecular weight of not more than 85 and the general formula R'CH=CR''C≡CH, wherein R' and R'' are selected from the group consisting of hydrogen atoms and monovalent saturated hydrocarbon radicals. Included among examples of compounds having the formula RC≡CH as hereinbefore defined are: acetylene, monovinylacetylene, methylacetylene, pentene-3-yne-1, hexene-3-yne-1, 3-methyl-butene-3-yne-1, and the like.

The process of this invention is operative at temperatures within the range of from 25° C. to 250° C. However, optimum results are had when said process is effected at a temperature within the range of from 30° C. to 100° C. The ratio of hydrogen fluoride to the compound having the general formula RC≡CH, as hereinbefore defined, may be varied over a wide range, such as from about 3 mols of hydrogen fluoride to one of acetylenic hydrocarbon to one mol of hydrogen fluoride to 2 of acetylenic hydrocarbon. In general, in order to insure maximum yields of fluorohydrocarbon, it is desirable to employ a mixture of hydrogen fluoride and acetylenic hydrocarbon in which the mol ratio of hydrogen fluoride to acetylenic hydrocarbon is within the range of from 2/1 to 1/1.

The process of this invention is preferably operated at normal pressures, e. g., substantially atmospheric pressure, but superatmospheric pressures or subatmospheric pressures may be used if desired.

Space velocity may be varied over a wide range and is generally within the range of from 50 to 300 because under these conditions optimum conversions are obtained.

By the term "space velocity," as employed herein and in the appended claims, is meant the rate at which the gaseous reactants pass through the catalyst and is defined as the number of volumes of gas, calculated at standard conditions, that traverse one volume of catalyst during one hour.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. The process for obtaining a fluorohydrocarbon, which comprises passing a mixture of hydrogen fluoride and a hydrocarbon of molecular weight not greater than 85 having the general formula RC≡CH, wherein R is of the group consisting of hydrogen atoms and monovalent hydrocarbon radicals, over charcoal-supported mercuric acetate, as catalyst, said mixture being passed over said catalyst under substantially anhydrous conditions in the vapor phase at a temperature within the range of from 25° C. to 250° C.

2. The process for obtaining a fluorohydrocarbon, which comprises passing a mixture of hydrogen fluoride and a hydrocarbon of molecular weight not greater than 85 having the general formula RC≡CH, wherein R is of the group consisting of hydrogen atoms and monovalent hydrocarbon radicals, over charcoal-supported mercuric acetate as catalyst, said mixture being passed over said catalyst under substantially anhydrous conditions in the vapor phase at a temperature within the range of from 25° C. to 250° C., the mol ratio of hydrogen fluoride to hydrocarbon being within the range of from 3/1 to 1/2.

3. The process for obtaining a fluorohydrocarbon, which comprises passing a mixture of hydrogen fluoride and a hydrocarbon of molecular weight not greater than 85 having the general formula R'CH=CR''C≡CH, wherein R' and R'' are of the group consisting of hydrogen atoms and monovalent, saturated hydrocarbon radicals, over charcoal-supported mercuric acetate, as catalyst, said mixture being passed over said catalyst under substantially anhydrous conditions in the vapor phase at a temperature within the range of from 30° C. to 100° C., the mol ratio of hydrogen fluoride to hydrocarbon being within the range of from 2/1 to 1/1.

4. The process for obtaining vinyl fluoride, which comprises passing a mixture of hydrogen fluoride and acetylene over charcoal-supported mercuric acetate, as catalyst, said mixture being passed over said catalyst under substantially anhydrous conditions at a temperature within the range of from 30° to 100° C., the mol ratio of hydrogen fluoride to acetylene in said mixture being within the range of from 2/1 to 1/1.

5. The process set forth in claim 4 wherein the gaseous mixture is passed over the catalyst at a space velocity within the range of from 50 to 300.

6. The process for obtaining 2-fluorobutadiene-1,3, which comprises passing a mixture of hydrogen fluoride and monovinylacetylene over charcoal-supported mercuric acetate, as catalyst, said mixture being passed over said catalyst under substantially anhydrous conditions at a temperature within the range of from 30° C. to 100° C., the mol ratio of hydrogen fluoride to monovinylacetylene in said mixture being within the range of from 2/1 to 1/1.

LEROY FRANK SALISBURY.

REFERENCES CITED

The following references are of record in the file of this patent:

UNITED STATES PATENTS

| Number | Name | Date |
| --- | --- | --- |
| 2,118,901 | Soll | May 31, 1938 |

OTHER REFERENCES

Gross et al., "Jour. Am. Chem. Soc.," vol. 64, pages 2289–92 (1942).

Freidlina et al., "Comptes Rendus (Doklady) de l'Academie des Sciences de l'U. R. S. S.," vol. 26, pages 60–64 (1940).

Varshavsky, ibid., vol. 29, page 315 (1940).